US012701644B2

(12) United States Patent
Bouchard et al.

(10) Patent No.: US 12,701,644 B2
(45) Date of Patent: Aug. 4, 2026

(54) METHOD AND SYSTEM FOR REDUCING FLICKERING-OF LAMPS POWERED BY AN ELECTRICITY DISTRIBUTION NETWORK

(71) Applicant: TECHNOLOGIES INTELIA INC., Joliette (CA)

(72) Inventors: Claude Bouchard, Joliette (CA); Hugo Bayeur, Joliette (CA)

(73) Assignee: TECHNOLOGIES INTELIA INC., Joliette (CA)

( * ) Notice: Subject to any disclaimer, the term of this patent is extended or adjusted under 35 U.S.C. 154(b) by 91 days.

(21) Appl. No.: 18/366,222

(22) Filed: Aug. 7, 2023

(65) Prior Publication Data

US 2024/0032175 A1 Jan. 25, 2024

Related U.S. Application Data

(63) Continuation-in-part of application No. 16/465,440, filed as application No. PCT/CA2017/051444 on Nov. 30, 2017, now Pat. No. 11,723,125.

(30) Foreign Application Priority Data

Nov. 30, 2016 (CA) ..................................... 2950054

(51) Int. Cl.
*H05B 45/30* (2020.01)
*H05B 45/59* (2022.01)

(52) U.S. Cl.
CPC .................................... *H05B 45/59* (2022.01)

(58) Field of Classification Search
CPC ........ H05B 45/10; H05B 45/12; H05B 45/20; H05B 45/32; H05B 45/37; H05B 45/42; H05B 45/48; H05B 45/52; H05B 45/54; H05B 45/3575; H05B 45/3578; H05B 45/3725
See application file for complete search history.

(56) References Cited

U.S. PATENT DOCUMENTS

| | | | | |
|---|---|---|---|---|
| 7,366,622 B1 * | 4/2008 | Nemir | G01R 31/1272 | 702/58 |
| 2009/0015172 A1 * | 1/2009 | Huang | H05B 45/10 | 315/246 |
| 2010/0141175 A1 * | 6/2010 | Hasnain | H01L 33/62 | 257/E33.05 |
| 2011/0285300 A1 * | 11/2011 | Yang | H05B 45/345 | 315/193 |
| 2013/0057169 A1 * | 3/2013 | Harel | H05B 45/3725 | 315/200 R |
| 2014/0239810 A1 * | 8/2014 | Martin-Lopez | H05B 45/3725 | 315/85 |
| 2014/0239849 A1 * | 8/2014 | Del Carmen, Jr. | H05B 45/3725 | 315/307 |

(Continued)

*Primary Examiner* — Tung X Le
(74) *Attorney, Agent, or Firm* — BROUILLETTE LEGAL INC.; Philippe Brouillette

(57) ABSTRACT

The invention generally comprises creating a signal conditioner that is capable of filtering, converting, segmenting and producing a periodic waveform from an electrical source, converting in into an electrical signal to drive an electrical device, such as a LED lamp, so that the behavior of the device driven by the electrical signal enables the device to perform a function that is practically free of the variations present in the main electrical source.

14 Claims, 19 Drawing Sheets

(56) References Cited

U.S. PATENT DOCUMENTS

| | | | | |
|---|---|---|---|---|
| 2014/0361696 | A1* | 12/2014 | Siessegger | H05B 45/395 315/193 |
| 2015/0145436 | A1* | 5/2015 | Hasegawa | H05B 45/24 315/294 |
| 2017/0027029 | A1* | 1/2017 | Hu | H05B 45/10 |

* cited by examiner

METHOD AND SYSTEM FOR REDUCING FLICKERING-OF LAMPS POWERED BY AN ELECTRICITY DISTRIBUTION NETWORK

CROSS-REFERENCE TO RELATED APPLICATIONS

The present patent application is a continuation-in-part of U.S. patent application Ser. No. 16/465,440, entitled "METHOD AND SYSTEM FOR A FLICKER-FREE LIGHT DIMMER IN AN ELECTRICITY DISTRIBUTION NETWORK", and filed at the United States Patent and Trademark Office on May 30, 2019 which claims the priority of the Canadian Patent Application No. 2,950,054, entitled "METHOD AND SYSTEM FOR FLICKER FREE LIGHT DIMMER ON AN ALTERNATIVE DISTRIBUTION NETWORK", filed with the Canadian Intellectual Property Office on Nov. 30, 2016, the contents of which are hereby incorporated by reference.

FIELD OF THE INVENTION

The invention presented generally relates to systems and methods allowing to alter and correct the electrical signal of an AC voltage which influence the lighting intensity of an electronic lamp such as a LED lamps with or without a control circuit. The invention further relates to systems and methods for reducing the flickering of lamps powered by one or more light dimmers by applying combinatorial strategies for segmenting the electric wave and distributing the electric power supplying one or more groups of lamps The invention also relates to all other areas of control application where an area of the electrical waveform from the electrical power distribution network are removed to control electrical equipment that regulates a function or a process such as the speed of an electric motor.

BACKGROUND OF THE INVENTION

For issues of backward compatibility with incandescent lamps, LED lamp manufacturers generally integrate electronic circuits that track the conduction angle of the supply voltage to vary the light intensity. Unlike the incandescent bulb, the luminous intensity of a LED lamp varies greatly for very small variation of the amplitude of the input voltage, especially near its conduction threshold. The result is that at low intensity, with a slightest disturbance or variation of the electrical signal supplying the LED lamp creates stressful flickering effects for humans and animals.

A popular method for varying the lighting intensity uses a TRIAC based controller. The flickering of lamps at low intensity is often produced by the activation of the TRIAC gated at the time where the amplitude of the electrical signal is below the conduction threshold of the LEDs or when the residual energy cumulated in various electrical components is restored and superimposed to the main voltage. This disturbance is greatly amplified when the length of a conductor that distributes the energy to the lamps is long or when the number of lamps connected to the same source is significant.

Several commercial, industrial and agricultural buildings are connected to the electrical network via a three-phase supply, typically between 380 VAC and 600 VAC. The supply of single-phase electrical equipment, including lighting, is generally carried out by means of a delta to Y transformer to lower the voltage to a level compatible with the operating voltage of the powered equipment, for example 120 VAC. The introduction of a transformer, dimensioned for the active load of the building, will necessarily introduce a reactive impedance likely to be activated by the switching of the lamps. When a large number of lamps switch simultaneously, the voltage at the output of the transformer will momentarily reduce and therefore affect the intensity of the lamps.

The transformer being an inductive component, the synchronous activation of one or more groups of lamps creates, at each switching, an instantaneous current demand first absorbed by the transformer then restored with an equivalent intensity. The intrinsic resistance of the transformer transforms the said variation of the current into a variation of voltage which modifies the instant of ignition, the duration, and the intensity of lighting of the lamp.

The current reaches a maximum level when the intrinsic lamp capacitors are discharged and the voltage driving the lamp is instantly applied. The electrical law of capacitors is that their capacitance adds up when they are connected in parallel and therefore even if the capacitance of each lamp is low, the sum of capacitances when connected in parallel creates a significant capacitor from the perspective of the transformer.

There are other scenarios where the electrical impedance of the building does not support a stable AC supply with switched loads, such as when using a local generator or a limit distribution transformer, or when the distance between the distribution transformer and the building is high.

In order to attenuate the variations of the electrical voltage caused by the simultaneous switching of the lamps, the lighting of the building is grouped in different segments of a number of lamps to be controlled. Each segment has a reduced lighting load and is typically controlled with an independent switch.

Thus, there is a need for an improved control method to reduce the flickering effect from lamps or lighting systems and that is designed to reach lower levels of light illumination than the methods currently in use.

SUMMARY OF THE INVENTION

The invention generally consists in creating a signal conditioner capable of filtering, converting, segmenting and generally producing a periodic waveform from an electrical source, converting it into an electrical signal to drive an electrical device, such as a LED lamp, so that the behavior of the device driven by the electrical signal enables the device to perform a function that is practically free of the variations present on the main electrical source.

Always with the intention of attenuating the variations in the electrical voltage caused by the simultaneous switching of the lamps, each of the lighting segments are switched at different times from the other segments during each of the alternations of the AC power supply. In the situation where the lighting intensities must be similar between the segments, the duration of the active switching is adjusted according to the time which separates the passage to zero from the AC alternation and the instant of switching of the sub-group.

In another aspect of the invention, an active load rapidly absorbing the residual energy on the lamp side of the conditioner when the conditioner cut-off the power to the device. Unlike a passive charge which typically dissipates a high amount of energy during the conduction phase of the electronic switches, the energy dissipated by the active charge during the conduction phase is almost zero and is limited to the energy accumulated in the electronic components in the device.

In another aspect of the invention, a method to eliminating the flickering of one or more LED lamps on an electrical power distribution network is described. The method includes synchronizing to the zero-crossing of the electrical power distribution network, power the LED lamps when the main voltage is above the conduction threshold of the LED lamps and cut off the power to the LED lamps.

The method may also include, during the cut off phase, means to empty the residual energy accumulated in the LED lamps. The LED lamp can also be activated by means of an electronic switch.

In a further aspect, the method may also include a preload step to store energy in the LED lamp before activating it.

Otherwise, the method also includes voltage rectification to store said energy into a bank of capacitors to later restore this energy in a controlled manner to the LED lamps. The energy recovery can take the form of a sinusoidal waveform, a trapezoidal waveform and/or an arbitrary periodic waveform.

In another aspect of the invention, the method includes measuring the light intensity emitted by the LED lamp and according to the light intensity emitted by the LED lamp, controlling the voltage sent to the LED lamp to obtain a predetermined and stable light intensity.

In one aspect of the invention, a system for eliminating flickering of one or several more LED lamps on an electrical distribution network is described. The system generally includes at least one switch connected to the LED lamp, an active bleeder circuit, a controller configured to synchronize at the zero-crossing voltage of the electrical distribution network, the controller being configured to close the switch when the main voltage is above the conduction threshold of the LED lamp, open the switch to turn off the LED lamp according to the intensity required and activate the bleeder circuit. The controller can also be configured to activate the bleeder circuit when the switch opens.

The system may also include a zero-crossing detection circuit connected to the controller and/or a feedback circuit allowing the correction of the output voltage applied to the LED lamp. The feedback circuit may include a light intensity sensor. This light intensity sensor could be an optical detector configured to convert the light emitted by the lamp into an electrical signal proportional to the light intensity.

In other aspects of the invention, the system also includes a current limiting circuit and/or a supply rectifying circuit system. The rectifying circuit of the power supply may include one or more capacitors configured to store the energy and restore it in a controlled manner to the LED lamps. With the help of a special circuit, the energy stored in the capacitor(s) can be restored in the form of a sinusoidal waveform, a trapezoidal waveform, and/or any arbitrary periodic waveform.

In yet other aspects of the invention, a method to reduce or limit flickering of lamps powered on an electric power supply and electrically connected to a plurality of independent dimmer outputs to balance the active load of the lamps on a plurality of lamp segments is provided. Each of the segments of lamps electrically connecting the lamps of the segments to an independent switch powering the lamps on and off at each cycle of alternance of the AC power.

In another aspect of the invention, the invention relates to systems and methods of reducing or limiting lamp flickering caused by synchronized switching of lighting loads in a single electrical installation.

In some aspects of the invention, the system for limiting flickering comprises a total lighting load distributed over several independent segments of lamps. Each of the segments are electrically connected to one or more lamps and to an independent electronic switch for driving all or part of each half cycle of the alternative current (AC) power supply The method of reducing flickering by distributing the electric load of the lamps over independent lamp segments may comprise distributing the instantaneous or actual power load when switching lamps by deferring the time at which the lamp segments are switched.

In one aspect, the method comprises activating lamp segments in sequence. The method further comprises shifting the phase of the current to allow any disturbance affecting the main signal (voltage level) when a switching of the lamps is performed to recover or be maintained to a voltage level close or equal to the voltage level present just before another segment in the sequence is activated.

The phase shifting is used to generate a short delay, at least 1 us, to let the AC source recover the overload caused by the instant in-rush current while a lamp segment is turning on.

When the lamps are powered to provide a low light intensity, the method comprises providing a different predetermined firing angle for each segment of lamps, and only the duration of the conduction period is increased as the targeted light intensity increases. In some embodiments, the low light intensity represents about less than 30% of the maximum light intensity of the lamps.

The method of distributing the lighting load between segments of lamps may comprise being randomized. The method may further comprise frequently modifying a switching angle of each segment of lamp using a random function. In some embodiment, the random function changes the switching angle at every half cycle of the AC. In yet other embodiments, the random function may be performed after one or a multiple half cycles. The random function may limit the frequency and duration of the light disturbances caused by the synchronized switching of several segments of lamps.

The method may further comprise adjusting or modifying the duration of the conduction period according to a switching angle of the signal and according to the desired light intensity of the lamp. Such adjusting generally aims at the lamps producing a stable light intensity at different switching angles.

The method may further comprise defining a characteristic curve of the intensity transmitted by the lamps according to the switching angle and to the duration of the conduction period. As such, the light intensity of the light is a function of the switching angles. The characteristic curve may further define a transfer function establishing the duration of the conduction period according to the desired lighting intensity and to the firing angle of the segment.

In another aspect of the invention, a method for distributing an electric load of the lamps between two different segments of lamps is provided. The method allows to distribute the load for each of the segment to have the same intensity without adjusting the duration of conduction period. The method further comprises reproducing or generating for each AC half-cycle, the commutations of a segment on a second segment by applying a minor inversion placed at the phase angle of 180°. More precisely, for a reference conduction initiated at angle X and ending at angle Y, the minor conduction period begins at angle 180°-Y and ends at angle 180°-X.

In additional aspects, the system may include an overload protection circuit, a short circuit protection circuit and/or a current meter connected to the LED lamp.

The features of the present invention which are considered novel and inventive will be described in more detail in the claims presented hereinafter.

BRIEF DESCRIPTION OF THE DRAWINGS

The advantages, objectives and features of the present invention will be more easily observable with reference to the following detailed description which will be made with the aid of the FIGS. in which.

DETAILED DESCRIPTION OF THE INVENTION

A new method and a system for a non-flickering light dimmer on an AC power distribution network will be described below. Although the invention will be described by taking as an example one or more preferred embodiments, it is important to understand that these preferred embodiments are used to illustrate the invention and not to limit its scope.

Figure 1:
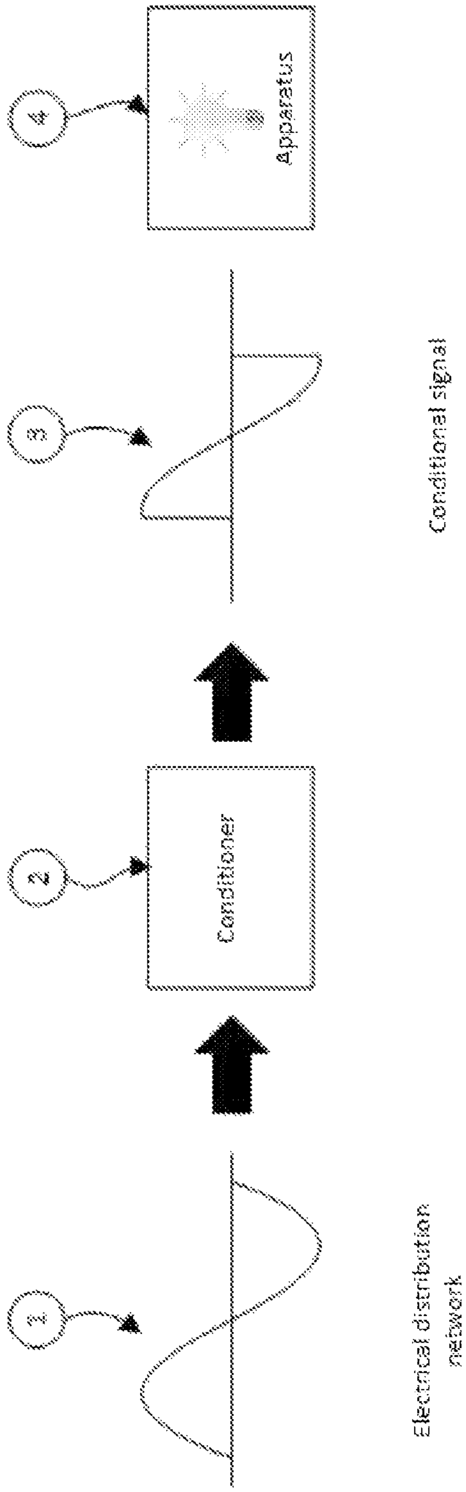
FIG. 1 illustrates the summary of the invention.

Referring to FIG. 1, a possible embodiment of the invention and its interconnection with a device or a series of devices connected in parallel is presented. The system 2, here called the conditioner 2, receives electric power from an alternative voltage source 1. The conditioner applies transformations to the supplied voltage to restore it to a device 4. The apparatus 4 may be a lamp, a motor or any other apparatus which converts electrical signal into any function such as light, motor power, motion, etc.

Electric

Figure 2:
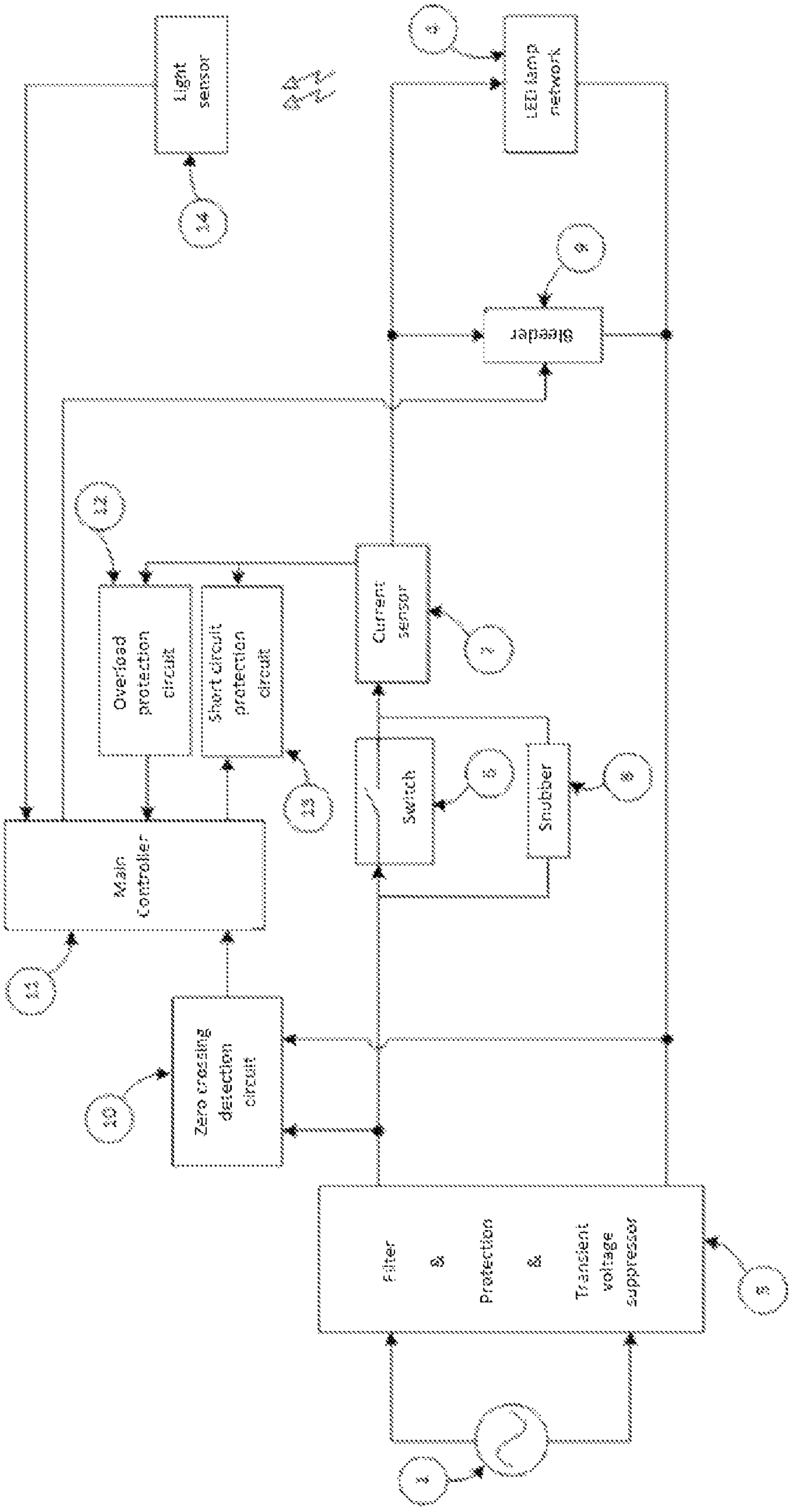
FIG. 2 illustrates the block diagram of the electronic circuit powered by an AC voltage from the electrical distribution network.
Figure 3:
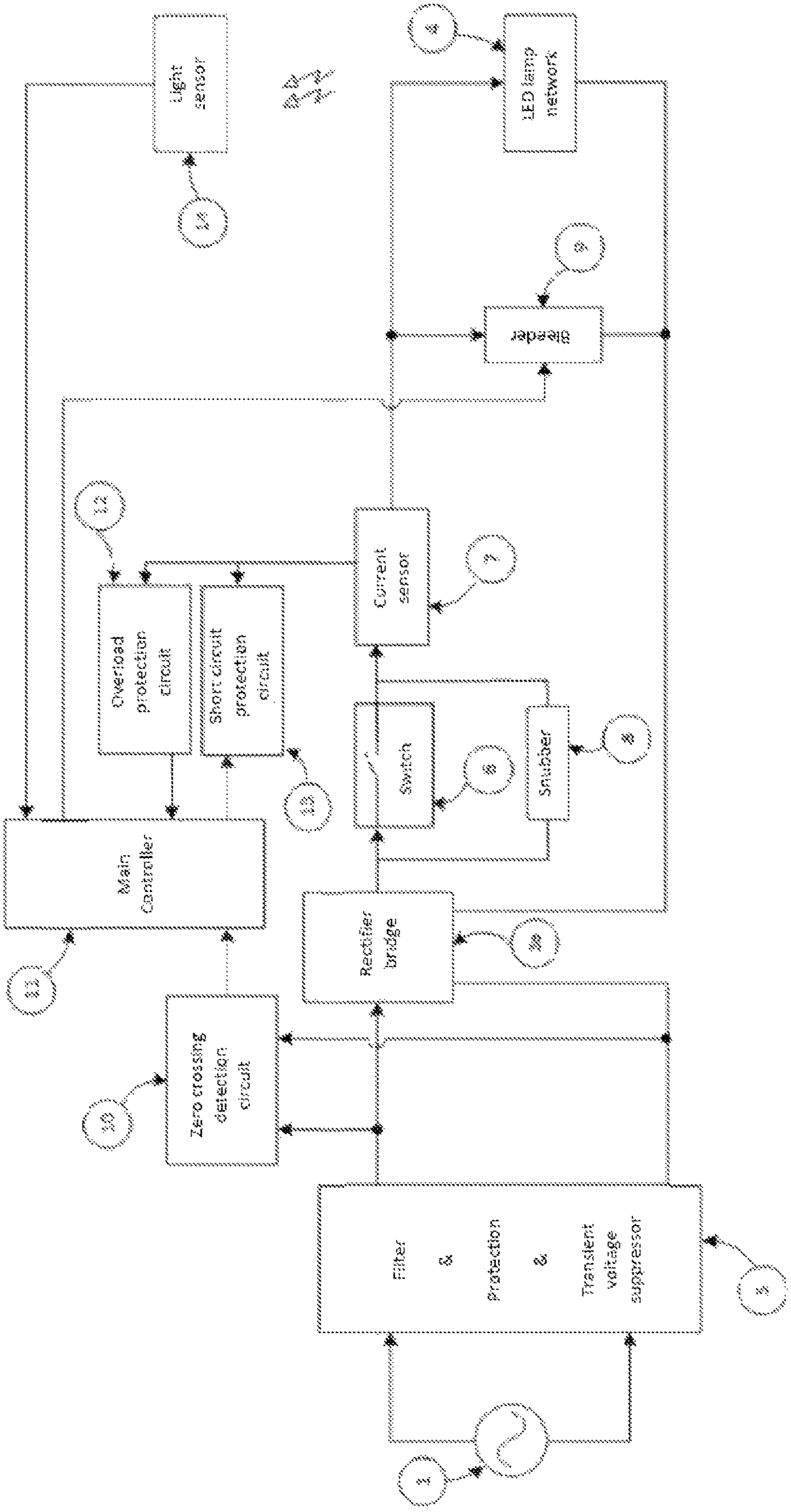
FIG. 3 illustrates the block diagram of the electronic circuit powered by a full-wave rectified DC voltage.

Referring now to FIGS. 2 and 3, two embodiments of circuits or electronic control systems used in the present invention are presented. The circuit illustrated in FIG. 2 typically operates with an AC voltage where the current flowing in the switch 6 is bidirectional. The second circuit illustrated in FIG. 3 has a bridge rectifier 3*a* which converts the AC voltage from the electrical distribution network into a full-wave rectified DC voltage where the current circulating in the switch 6 is unidirectional. The front-end filter and protection circuit 5 aims to protect the electronic components against power distribution network overvoltage and aims to limit the conducted emissions. A zero-crossing voltage detection circuit 10 allows the main controller 11 to synchronize with the beginning of each cycle of the main voltage of the power distribution network. A brightness command from a user interface or from an external circuit (not shown here) enable a sequence of activation to the switch 6 in order to allow the control of the intensity of the LED lamps 4. A snubber circuit 8 allows the absorption of the energy stored in the wiring inductance of the network of the LED lamp and protects the switch 6 against overvoltages. An active bleeder circuit 9 drains the energy accumulated in the snubber circuit 8 as well as the residual energy stored in the components of the LED lamp network in order to guarantee a precise and controlled transition of voltage applied to the LED lamp. The system may include an overload protection circuit 12 and a short-circuit protection circuit at start-up 13, typically implemented using, for example, a current-voltage converter 7. This type of circuit 13 generally allows the protection of the electrical power components against a current overload and also limit the heat dissipation of the components. The system may also include a detection circuit, here expressed by the light detector 14, generally intended to allow a feedback to the controller to regulate, for example, the output voltage to the LED lamps.

Figure 5:
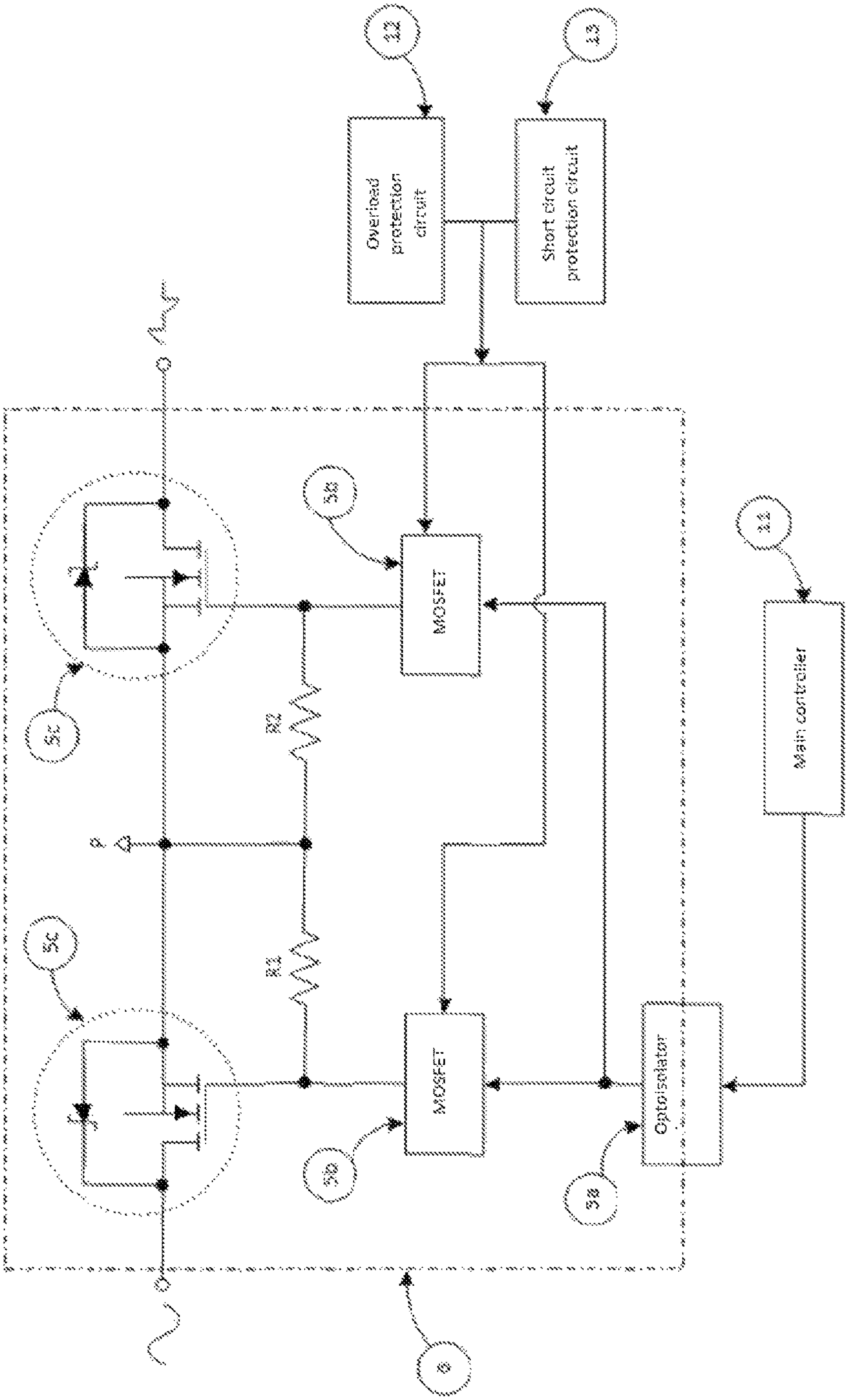
FIG. 5 illustrates the switching circuit powered by an AC voltage from the electrical distribution network.
Figure 6:
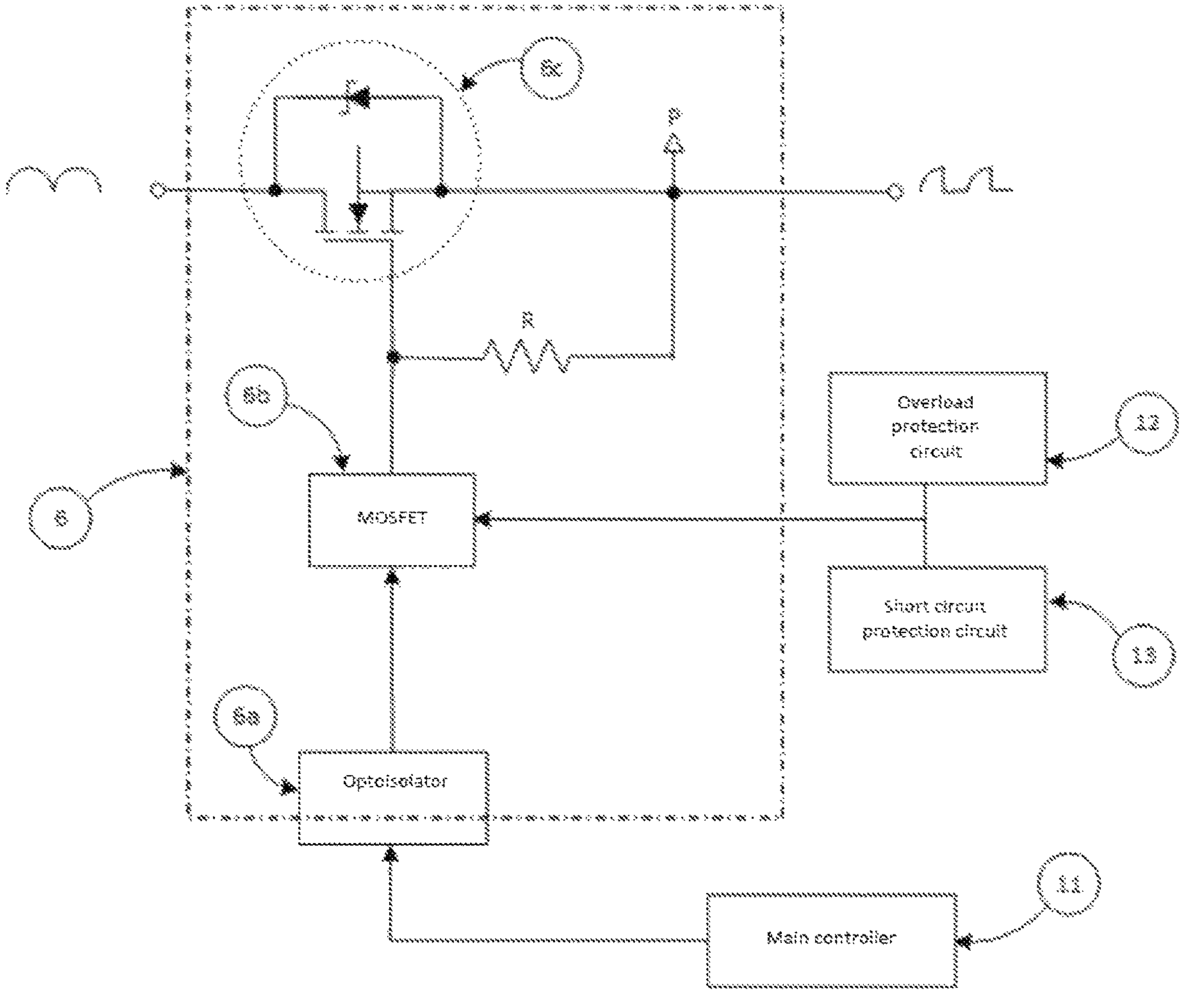
FIG. 6 illustrates the switching circuit powered by a full-wave rectified DC voltage.

Referring now to FIG. 5, an embodiment of the switching circuit of the AC lamp controller is presented. FIG. 6 illustrates a circuit similar to the switching circuit of FIG. 5 but supplied with a full-wave rectified DC voltage. The circuit typically includes a main controller 11 configured to control the activation of the switch 5*c* and/or 6*c* via a galvanic isolation circuit 5*a* and/or 6*a* and a MOSFET driver 5*b* and/or 6*b*. As a preference only, optical isolators 5*a* and/or 6*a* may be used in this circuit. Of course, other components such as magnetic, capacitive, Hall Effect or RF isolators may be used. The switch 5*c* and/or 6*c* may include one or more MOSFETs and/or other components such as bipolar transistors or IGBTs. The use of power MOSFETs connected in parallel is also possible and allows to create a power switch with very low resistance which can significantly reduce the power losses. Such a switch circuit generally aims to reduce the size of the heat sink until it can be removed, if the equivalent thermal resistance allows.

Figure 11:
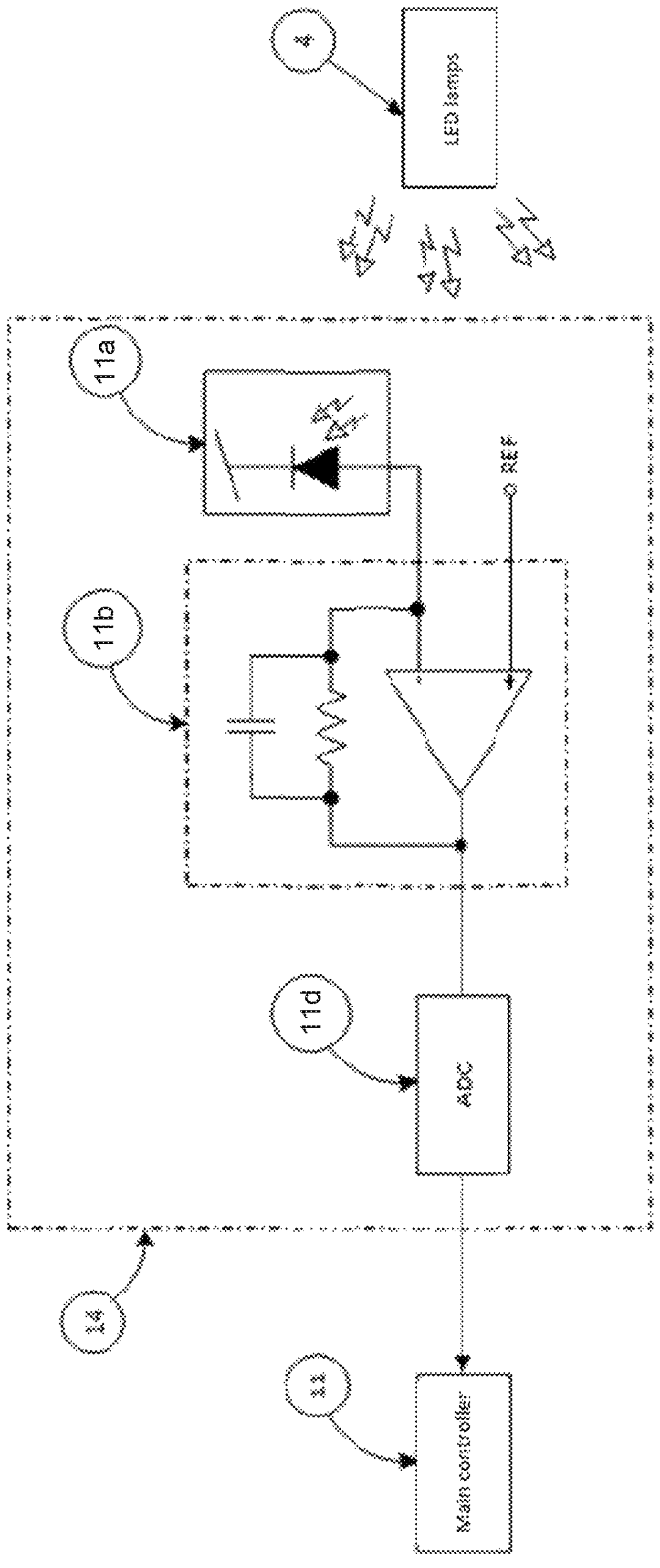
FIG. 11 illustrates the optical feedback circuit to regulate the light intensity.
Figure 12:
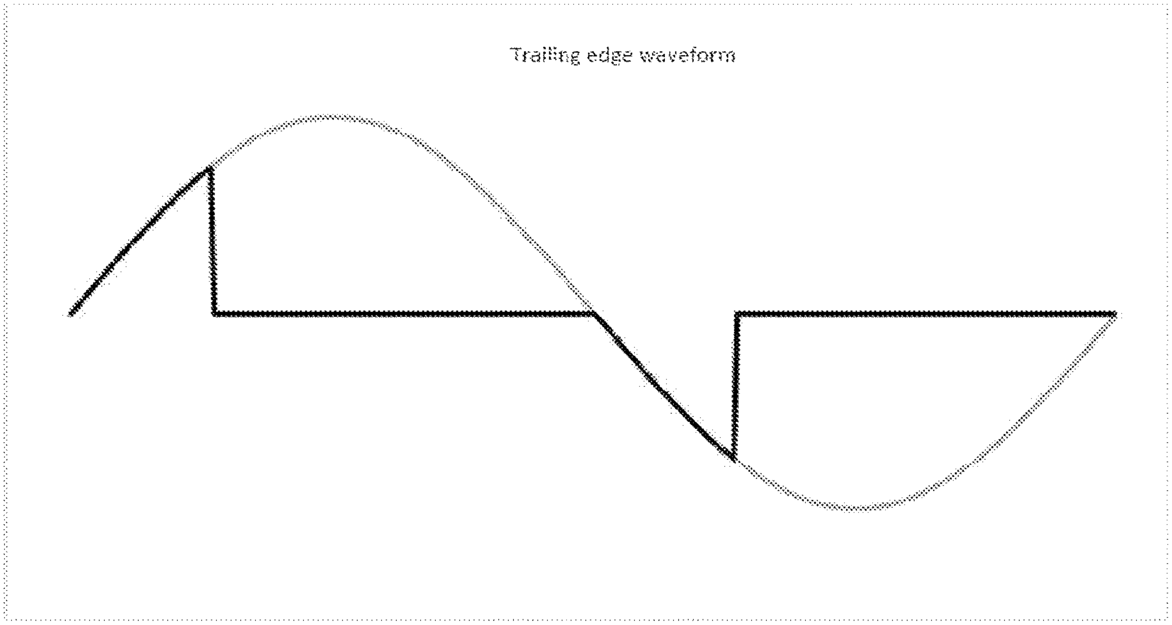
FIG. 12 illustrates the trailing edge control mode.

Referring now to FIG. 11, an embodiment of a feedback circuit 14 generally used for reducing or extending the lamp activation period to regulate the lighting intensity at the requested set point is presented. The circuit 14 is generally made with an optical detector 11*a*. The optical detector 11*a* generally converts the light emitted by the LED lamps into an electrical signal proportional to the light intensity. The electrical signal is then amplified by a transimpedance amplifier 11*b* and then converted to a digital value by the analog-to-digital converter 11*d*. Without limitation, and preferably, a photodiode 11*a* is used in this embodiment of the circuit 14. On the other hand, other optical sensors such as a phototransistor, a photocell or a solar cell may also be used. In other embodiments, the analog-to-digital converter 11*d* may be replaced by a pulse width modulation (PWM) circuit controlled by the output of the amplifier 11*b* and coupled to a logic input of the main controller 11.

The active bleeder 9 is generally intended to absorb some of the residual energy stored by the wiring inductance of the LED lamps cables, the energy stored in the snubber 8 and the residual energy from other electronic components on the line. This absorption typically allows faster cut off of each activation cycle of the switch 6 and generally prevents that this energy be consumed by the lamps. One or more fast turn off time(s) during each cycle of the electrical distribution network aims to better control the LED lamps which have a basic front-end threshold detection circuit as a control circuit in dimming mode.

Figure 7:
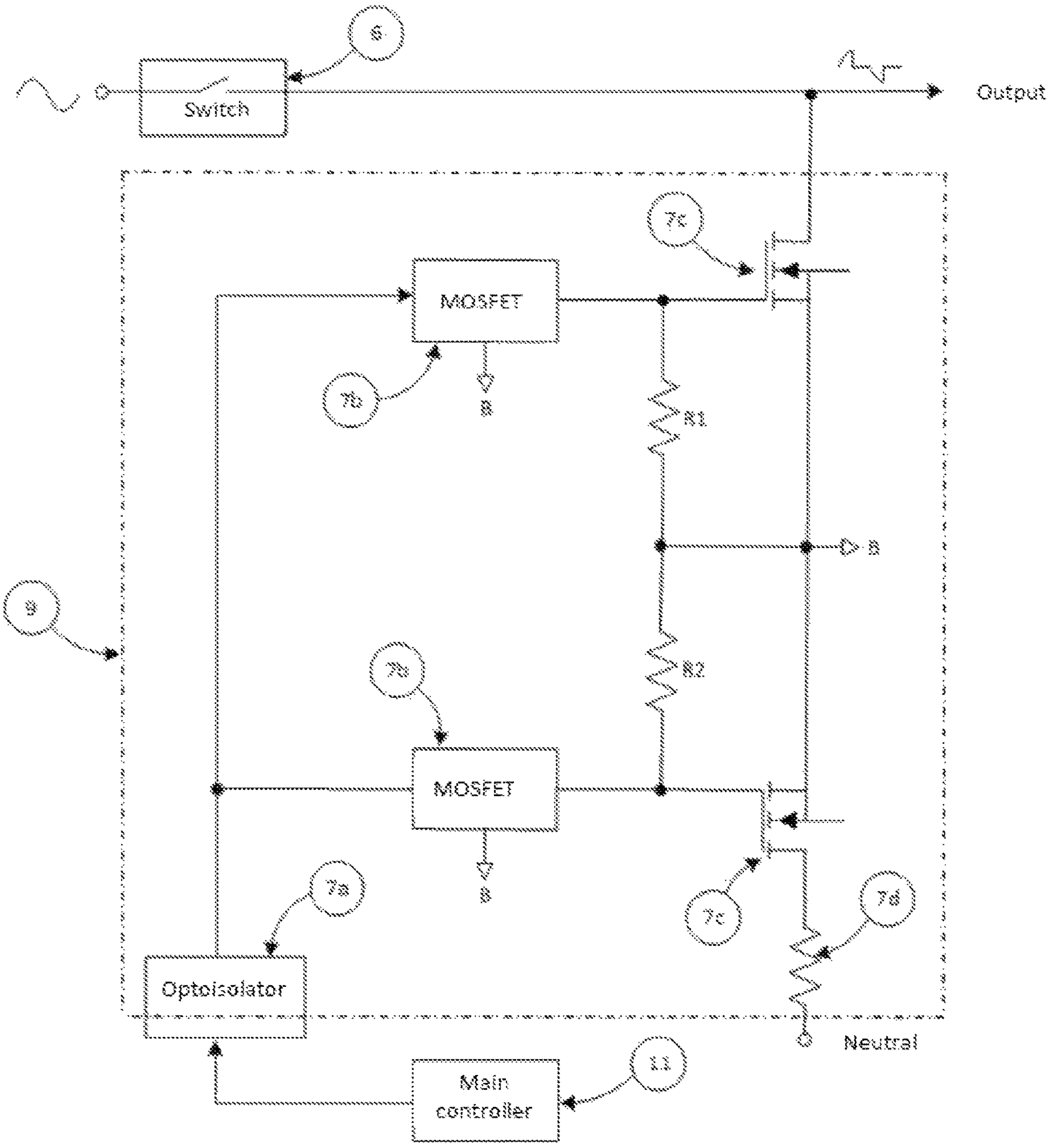
FIG. 7 illustrates the active bleeder circuit powered by an AC voltage from the electrical distribution network.
Figure 8:
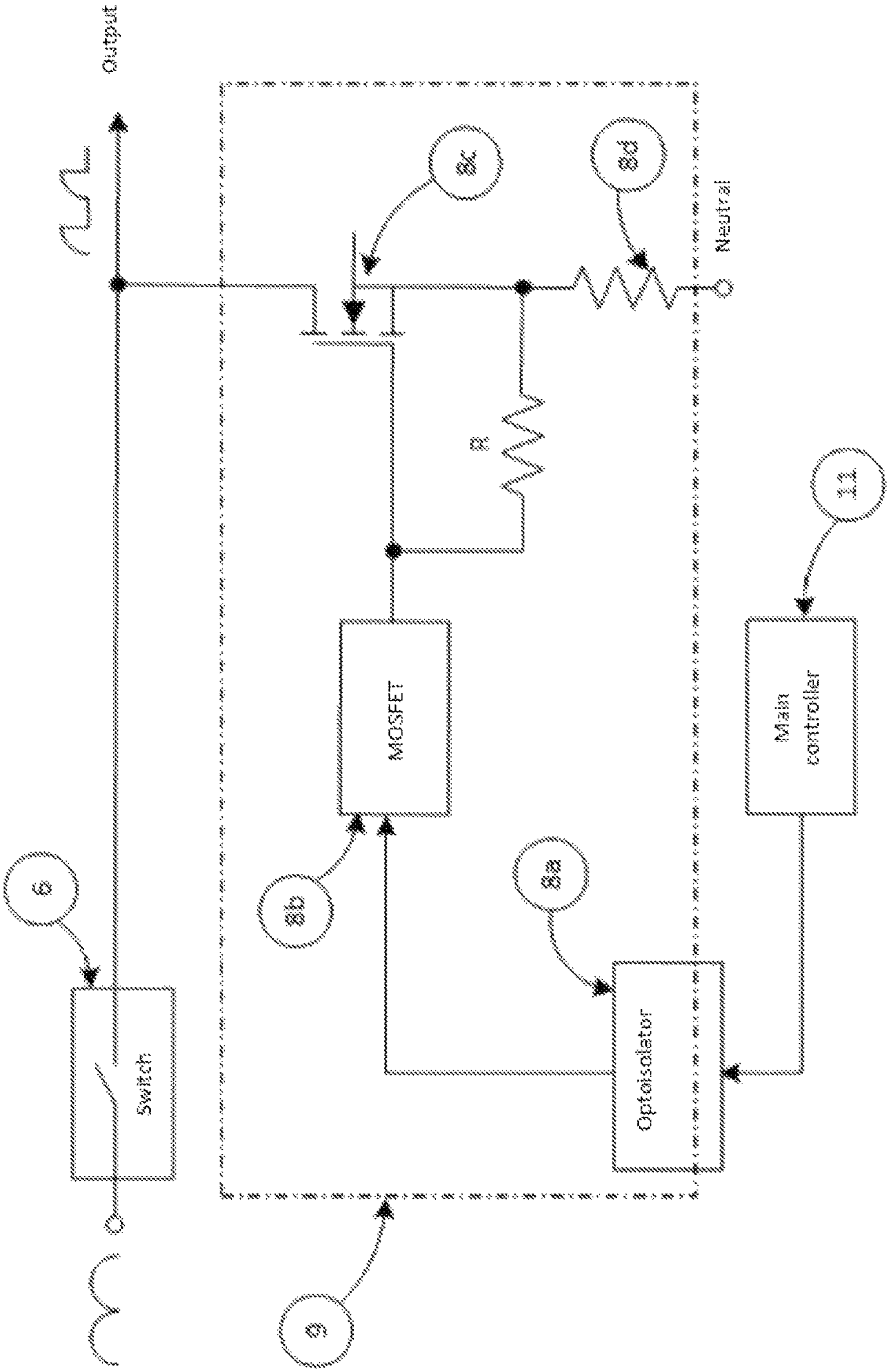
FIG. 8 illustrates the active bleeder circuit powered by a full-wave rectified DC voltage.

Referring now to FIG. 7, an embodiment of an active bleeder circuit 9 in AC mode is presented. FIG. 8, illustrates another embodiment of the circuit 9 of FIG. 7 but with a full wave rectified DC voltage. The active bleeder circuit 9 typically includes a resistive load 7*d* and/or 8*d* which is engaged in parallel with the LED lamps by the switch 7*c*8*c* when the switch 6 open. As a preference only, MOSFETS 7*c* and/or 8*c* may be used to activate the resistive load 7*d* and/or 8*d*. In other embodiment, other components such as bipolar transistors or IGBTs can be used in the circuit 9. The main controller 11 controls the activation of the switch 7*c* and/or 8*c* via a galvanic isolation 7*a* and/or 8*a* and MOSFET driver 7*b* and/or 8*b*. As a preference only, optical isolators 7*a* and/or 8*a* may be used in circuit 9 but other components such as magnetic, capacitive, Hall Effect or RF isolators may be substituted. Without limitation, the activation sequence of the switch 6 and the switch 7*c* and/or 8*c* may be 180 degrees out of phase but may also include a different sequence which allows a better control of the LED lamps.

Figure 9:
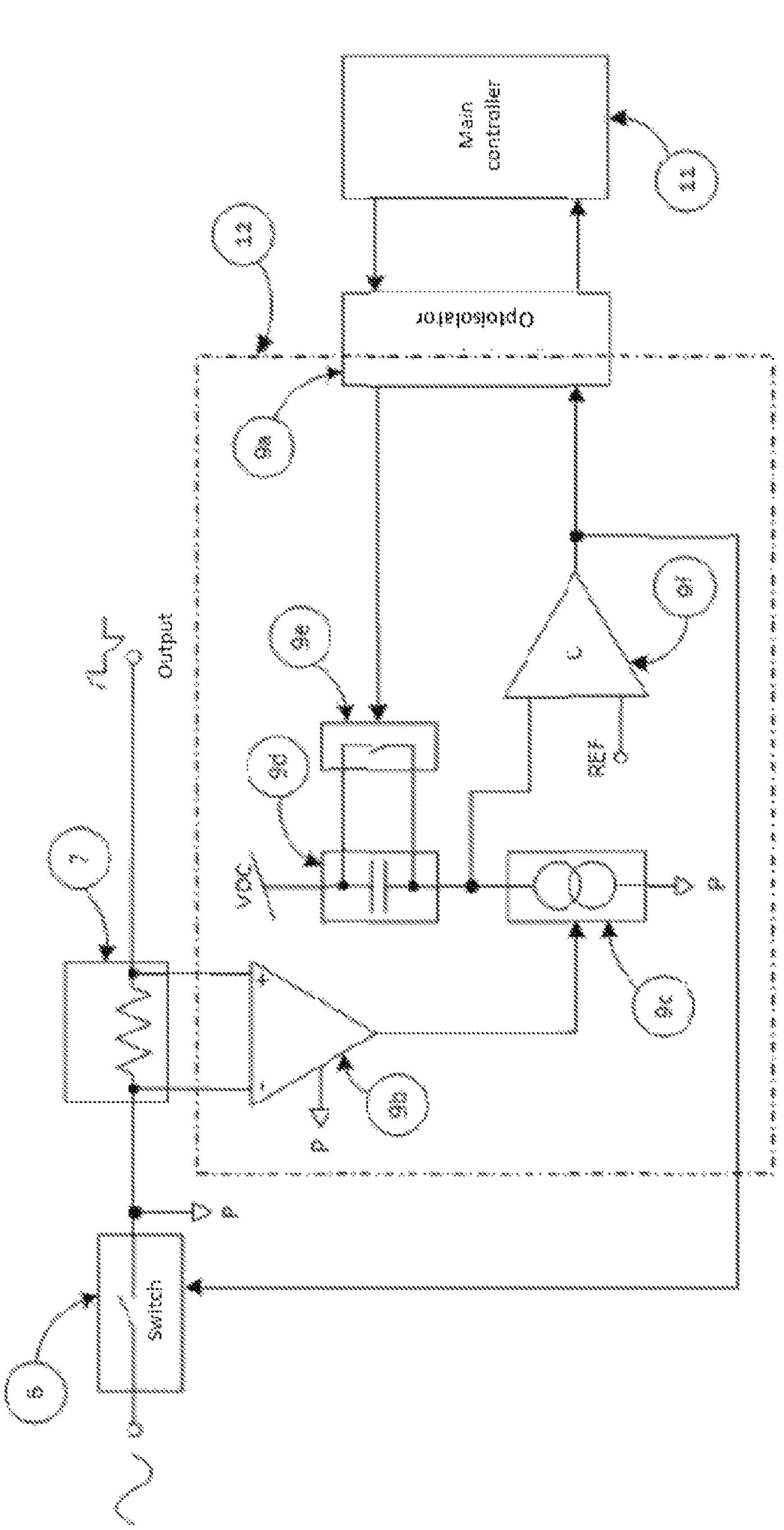
FIG. 9 illustrates the protection circuit against overloads.

Referring to FIGS. 5 and 6, a current limiting circuit 12 including an integrator generally allows the removal of the fuse and protect the power switches 6 against excessive loads. An embodiment of the current limiting circuit 12 is illustrated in FIG. 9 and can function in AC or with a full wave DC voltage. The current measurement through switch 6 is typically done using a current-voltage converter 7, preferably a low value resistor. Without being limited, the current sensor circuit 7 may also include a current transformer or a Hall Effect sensor. The output signal from the current sensor 7 is generally directed to an amplifier 9*b* whose exit drives a variable current source 9*c* where the intensity is proportional to the current flowing in the switch 6. An integrator circuit formed by the current source 9*c*, the capacitor 9*d* and the switch 9*e* allows to integrate the current waveform flowing in the circuit of the LED lamps. The output of the integrator is compared to a reference voltage using the comparator 9*f*. Exceeding the threshold on the comparator 9*f* will cut off the power to the LED lamps by opening the switch 6. This shut down aims to protect the power electronic components. The capacitor 9*d* is discharged at the zero-crossing time of the main supply. The current limiting circuit 12 is typically galvanically isolated using the isolating circuit 9*a*. In a preferred embodiment, the circuit 12 may include optical isolators (9*a*) or other components such as magnetic, capacitive, Hall Effect or RF isolators. The circuit 12 may also include an alarm indicating an overload redirected to the main controller 11 to be processed.

Figure 10:
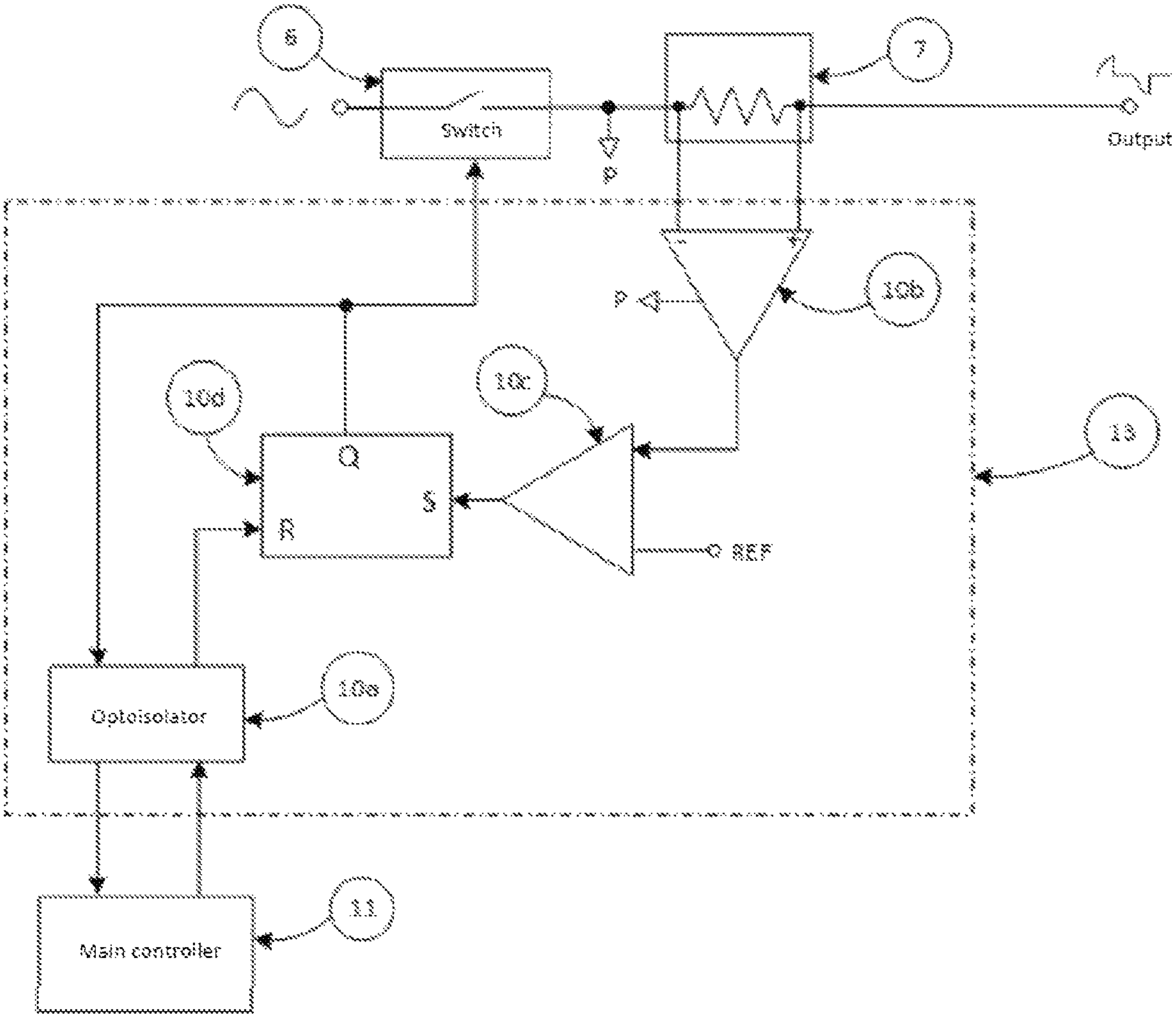
FIG. 10 illustrates the short circuit detection circuit at startup.

A protection circuit against short circuit at start-up 13 generally protects electric and electronic components against overload in case of a bad connection made by the user. A preferred embodiment of the protection circuit 13 is illustrated at FIG. 10, it works in AC or with a full wave DC voltage. The current measurement through switch 6 is typically done using a current-voltage converter 7, preferably a low value resistor. Without being limited, the current sensor circuit 7 may also include a current transformer or a Hall Effect sensor. The output of the current converter 7 is generally directed towards an amplifier 10*b* followed by a comparator 10*c* and a flip-flop D-Latch 10*d*. The peak current flowing through the switch 6 is typically limited by the opening of the switch 6 when the current is above the limiting threshold at each half-cycle of the AC voltage or at each cycle of a full wave rectified voltage. The D-Latch is reset at the zero-crossing time of the supply voltage. The short-circuit protection circuit 13 is generally galvanically isolated using an optical isolator circuit 10*a*. In a preferred embodiment, optical isolators 10*a* are used in this circuit. In other embodiments, other components such as magnetic, capacitive, Hall Effect or RF isolators may be used. An alarm indicating a short circuit at start up can be directed to the main controller 11 for processing.

Figure 4:
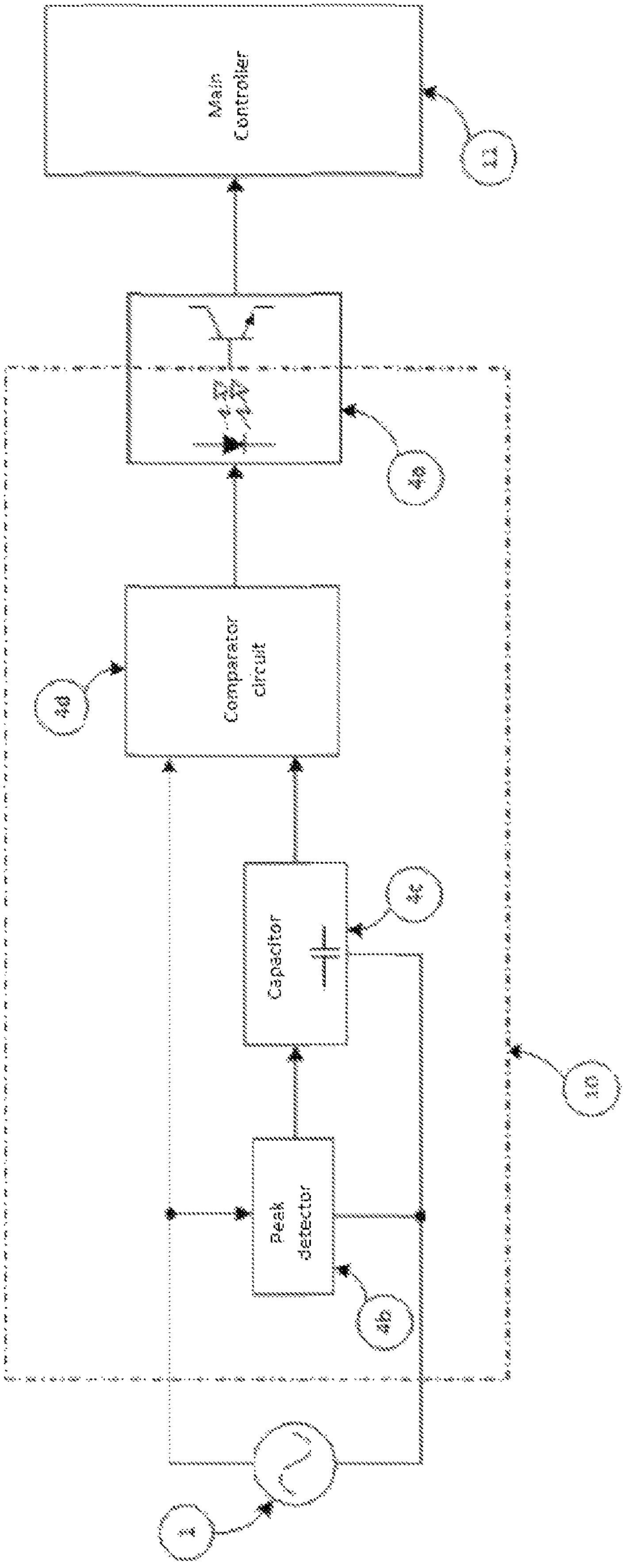
FIG. 4 illustrates the zero-crossing detection circuit of the main voltage.

The zero-crossing detection circuit 10 is done with a fast and precise level detection circuit. An embodiment of the zero-crossing detection circuit 10 is illustrated in FIG. 4. The capacitor 4*c* is charged at the limited voltage determined by the clamping circuit 4*b*. The comparator 4*d* is trigged when the input voltage drops below the voltage reference determined by the voltage across the capacitor 4*c*. Without being limited, the comparator output 4*d* may drive a galvanic isolator 4*a* which transmits the zero-crossing time to the main controller 11. In a preferred embodiment, the circuit 10 may also include an optical isolator. In other embodiments, the circuit 10 may include other components, such as magnetic, capacitive, Hall Effect or RF isolators.

In embodiments where the system includes two or more outputs, the activation of the switches 6 can be delayed by a few microseconds to decrease the inrush current from the electrical distribution network and thus reduce the voltage drop which can impact the behavior of the load 4.

In other embodiments of the invention, other configurations are possible to eliminate the flickering of LED lamps due to fluctuations in the power distribution network by rectifying the input voltage and then storing the energy in capacitor banks in order to restore it to the lamps in a controlled way.

The restitution of the energy may be done in different ways including, for example, a DC constant voltage, a sinusoidal wave whose amplitude and frequency are controlled, a trapezoidal wave that allows better intensity control than the sinusoidal waveform while maintaining slow transitions to reduce conducted emissions and electromagnetic radiation.

The proposed circuit is made with a PWM modulator where the useful cycle varies according to the input waveform. This resulting waveform is then filtered using a passive or active low-pass filter to keep only the DC component. The useful cycle variation changes the amplitude of the DC component and builds an arbitrary periodic waveform that is transmitted to the circuits of the LED lamps.

Software

Figure 13:
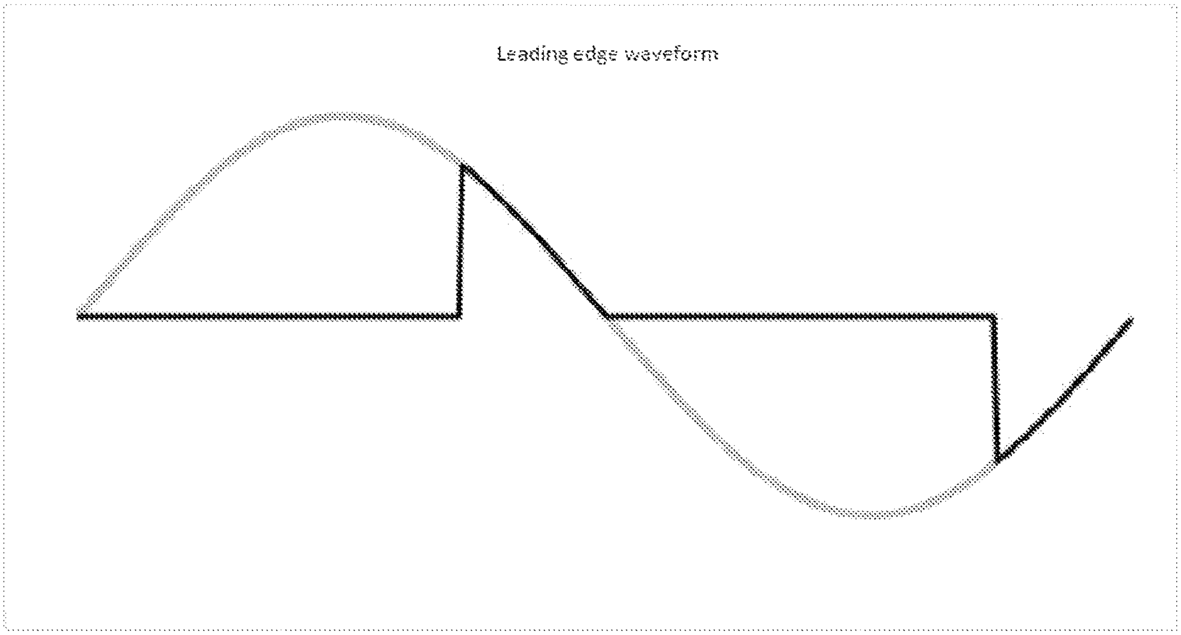
FIG. 13 illustrates the leading-edge control mode.
Figure 14:
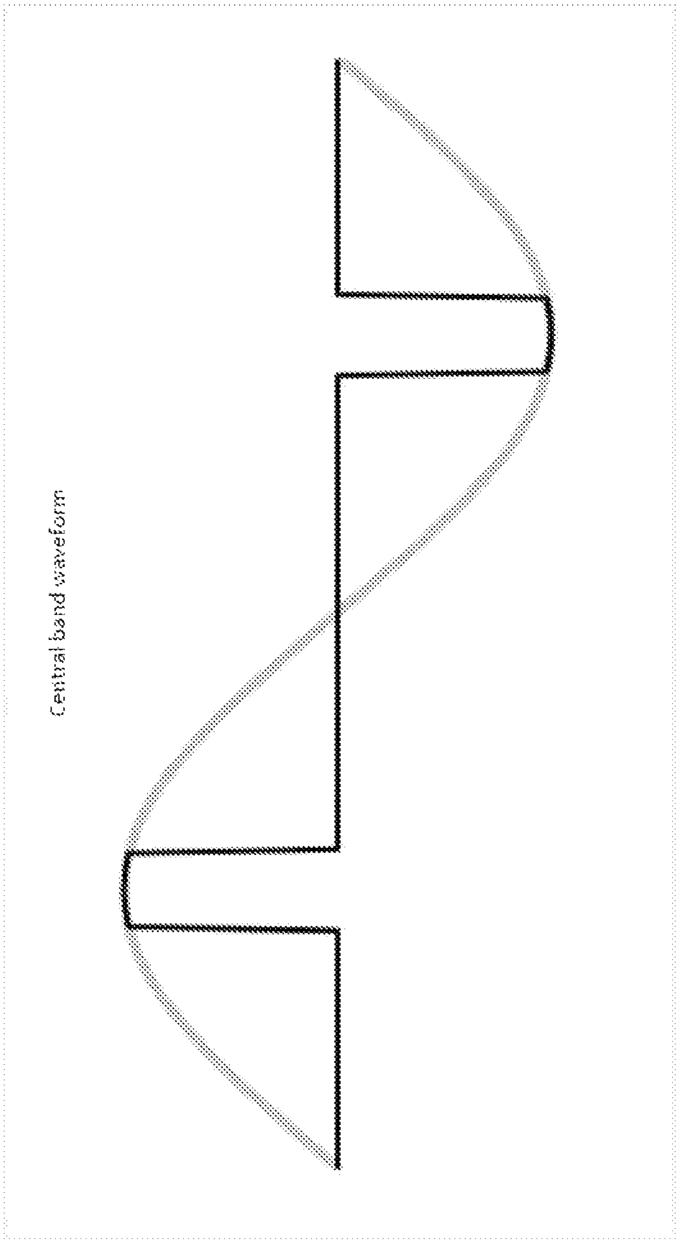
FIG. 14 illustrates the central band control mode.
Figure 15:
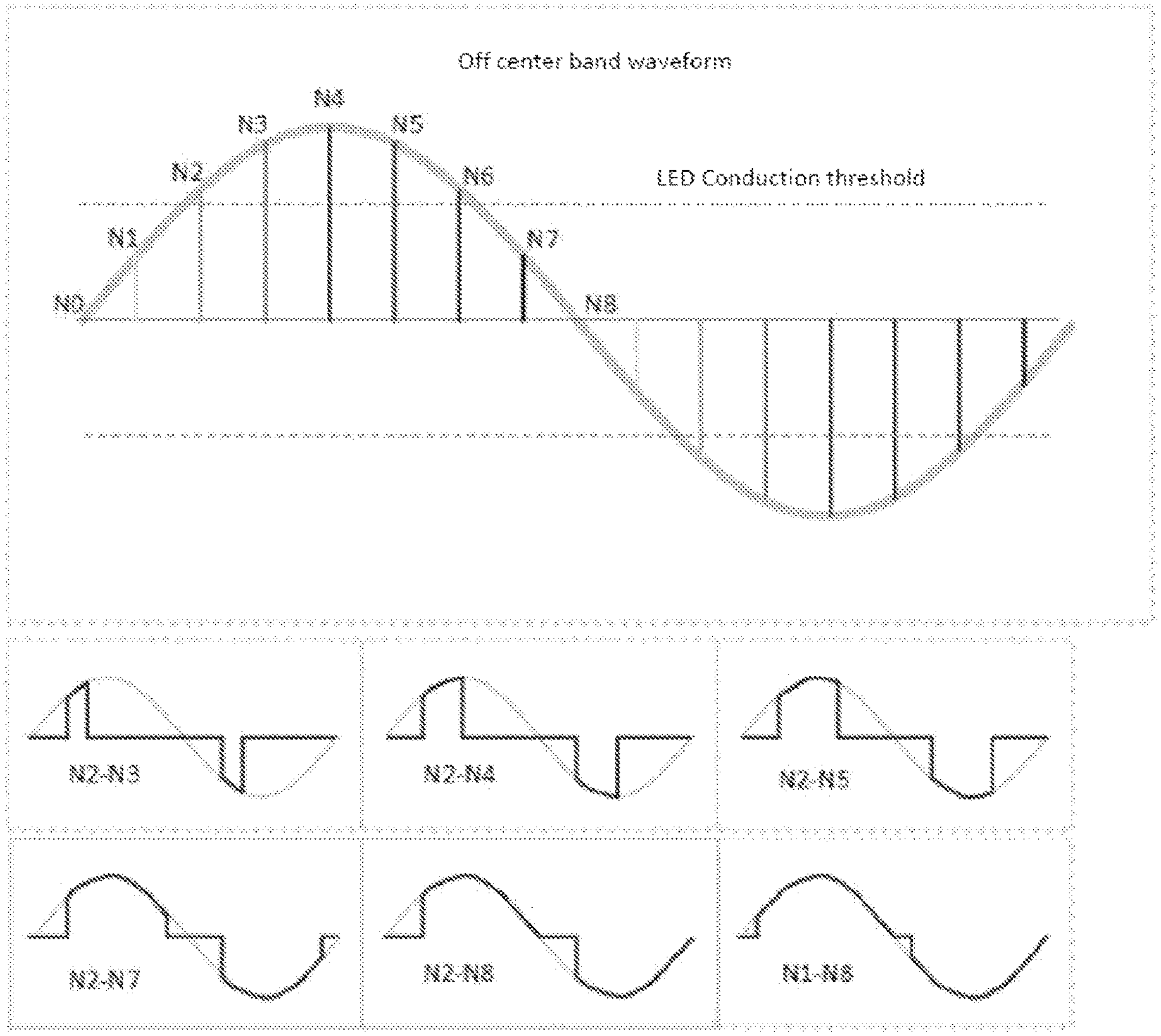
FIG. 15 illustrates the off-center band control mode.
Figure 16:
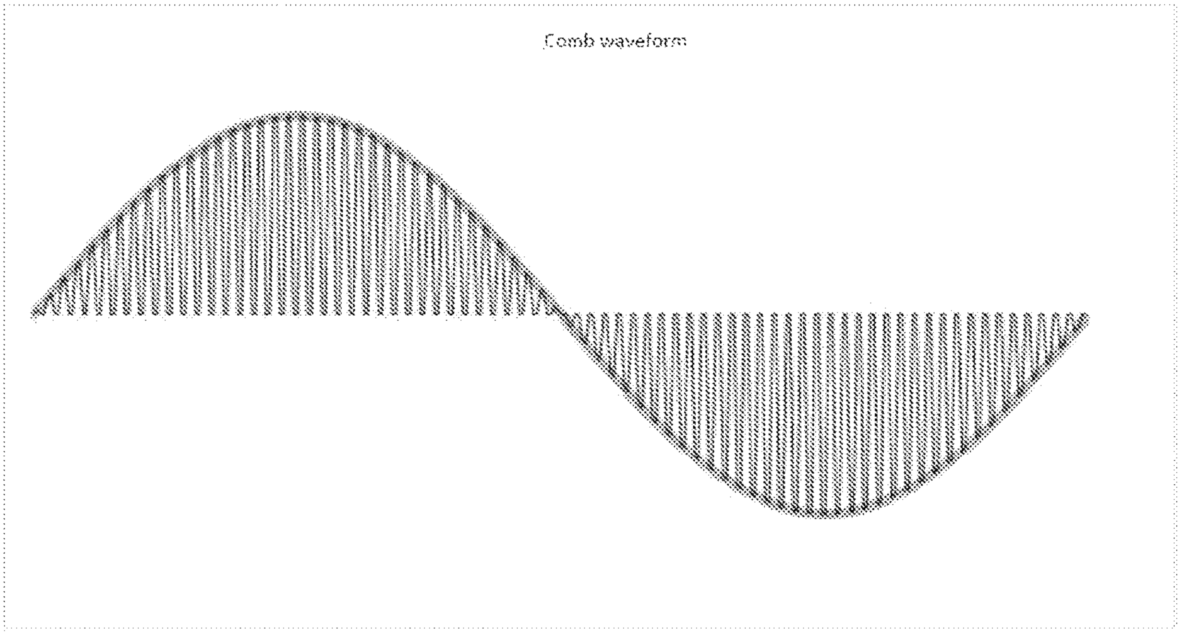
FIG. 16 illustrates the comb type control mode.

Referring now to FIG. 15, a possible embodiment of the off-centre band control mode method is presented. The control method generally aims to offer several advantages including, in many cases, better stability at low intensity of the apparatus 4 and a lower inrush current than the central band mode (FIG. 14) and leading-edge control mode (FIG. 13).

The control method generally consists of turning on the electronic switch 6 when the AC voltage reaches a predetermined amplitude in the modus operandi of the device. The amount of energy delivered to the apparatus 4 is generally determined by the duration of the conduction cycle of the electronic switch 6. Referring to FIG. 15, the energy delivered to the apparatus is progressively increased and follows the following sequence: at the minimum value, the electronic switch is turned on, for example, at N2 and turned off at N3, then gradually from N2 to N4, from N2 to N5, until the conduction window goes from N2 to N8. Following this, the energy is increased by extending the conduction period from N1 to N8, and the maximum energy is transmitted when conduction goes from (N0) to N8. The reduction of the transmitted energy is the opposite of the progression, namely, (N0) to N8, N1 to N8, N2 to N8, N2 to N7, N2 to N6, up to the minimum conduction time of N2 to N3. In FIG. 15, the time interval between N0 N1, N2 . . . N8 is suggestive only and is adapted in accordance with the target device.

Figure 17:
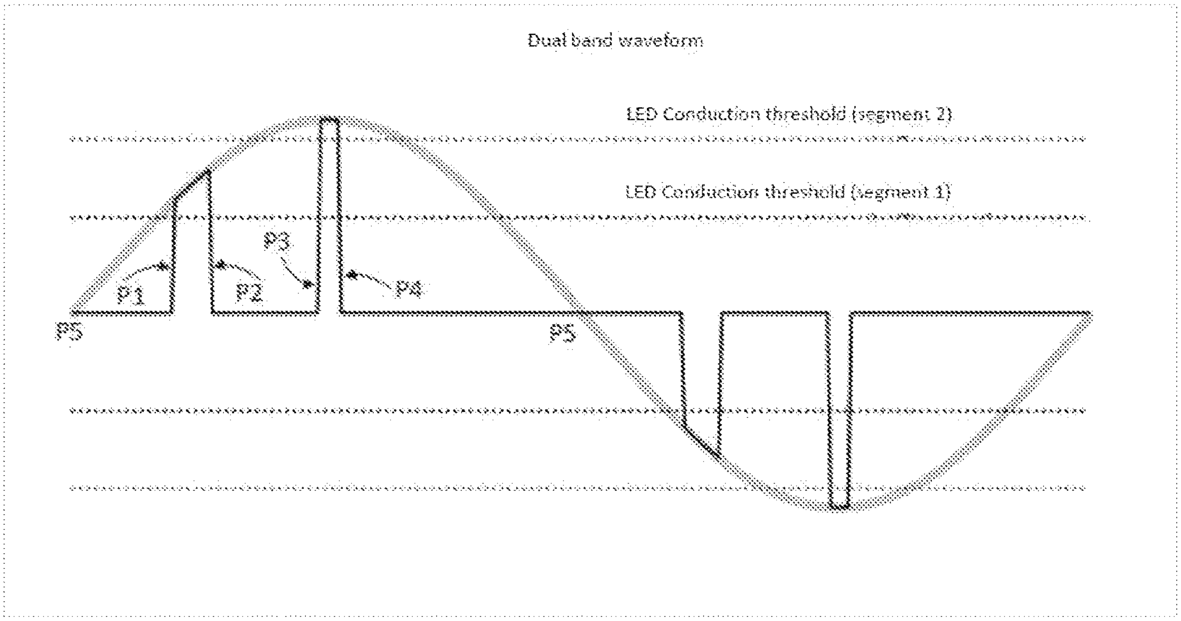
FIG. 17 illustrates the dual-band type control mode.

In embodiments in which the lamp is manufactured with multiple LED string lights in parallel, the control algorithm can allow multiple on-cycles to supply each string light in the conduction band of the LEDs. As illustrated in FIG. 17, the activation can first occur at P1 when the electrical distribution network voltage exceeds the conduction threshold of the first series of LEDs. The intensity is then gradually increased by delaying the first cut-off P2. When the voltage at time P2 approaches the conduction threshold of the second series of LEDs, a second pulse centered on the peak voltage of the voltage line is activated. Eventually, the second pulse will merge with the first one when P2 and P3 overlap. Finally, P1 and P4 move toward their zero-crossing P5 to obtain a full wave.

Figure 18:
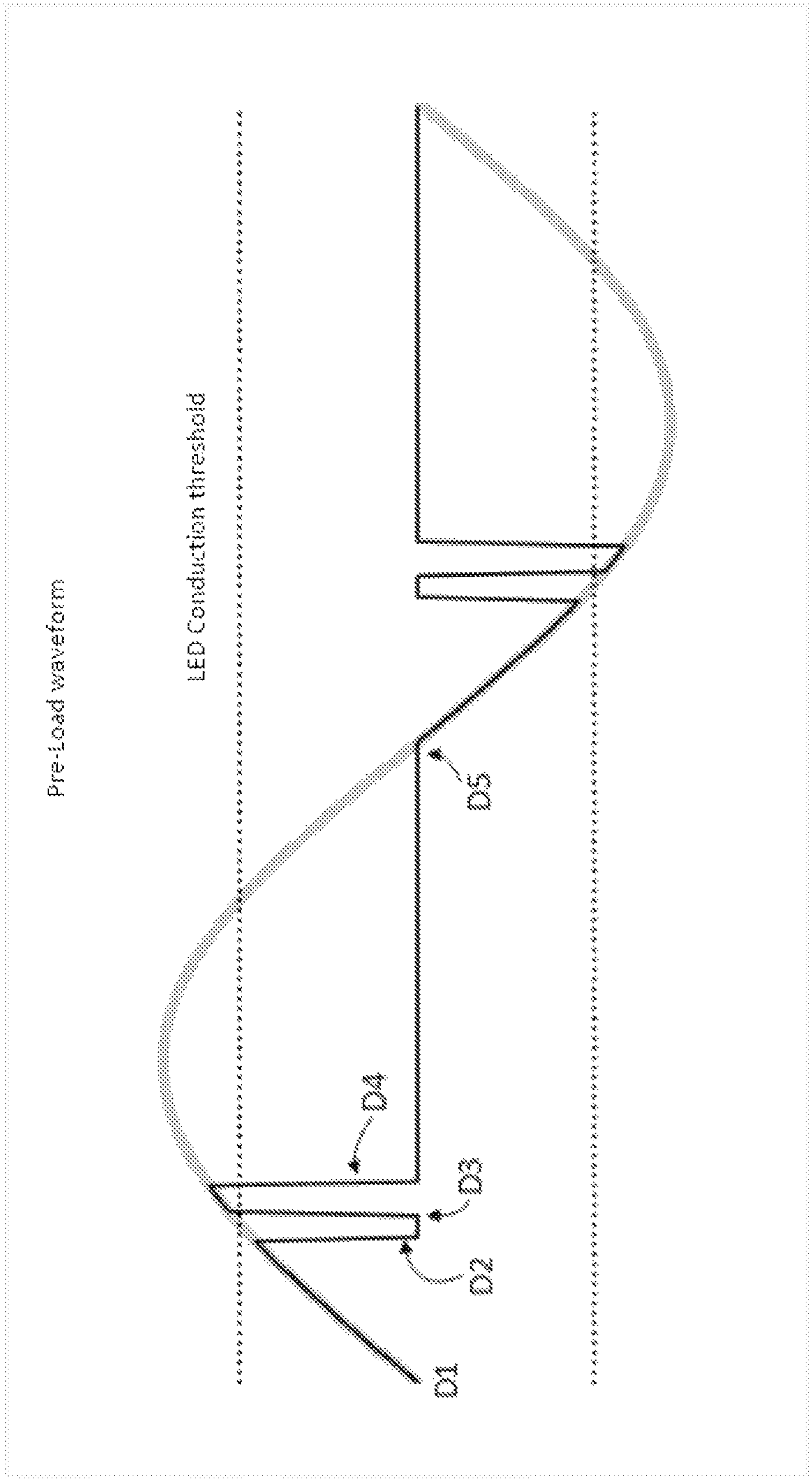
FIG. 18 illustrates the preload type control mode.

In a typical embodiment in which a LED lamp is manufactured with high a capacitive reactance, the control algorithm can allow a progressive charge of the capacitor of the lamp using a slow rise time to limit inrush current from the electrical distribution network. Referring now to FIG. 18, the first activation cycle is started at the zero-crossing time D1 and ends at D2 below the conduction threshold of the LEDs. The time interval between D1 and D2 is dedicated to charge the input capacitor of the lamp below the conduction threshold of the LED. During this time, there is no luminous intensity from the lamp. A second conduction cycle is triggered when the voltage exceeds the conduction threshold of the LEDs. This cycle permits the activation of the LED segment of the lamp. The LED string activation threshold is located at D3 and the intensity is controlled by the pulse width starting at D3 and ending at D4. The increase in luminous intensity is generally achieved progressively by increasing the duration of the pulse width of the second cycle until reaching D5. The activation of the charge cycle of the input capacitor preferably begins at the zero-crossing point D1 of the main voltage but can also be enabled at any time in the range of D1 to D2.

Typically, the method makes it possible to carry out, without limitation, all waveforms presented using preprogrammed modes in order to produce the waveform adapted to the circuit of the lamp and to the topology of the installation.

In addition to the control modes defined above, the method allows the establishment of any particular periodic waveform with the voltage available from the electrical distribution network.

Figure 19:
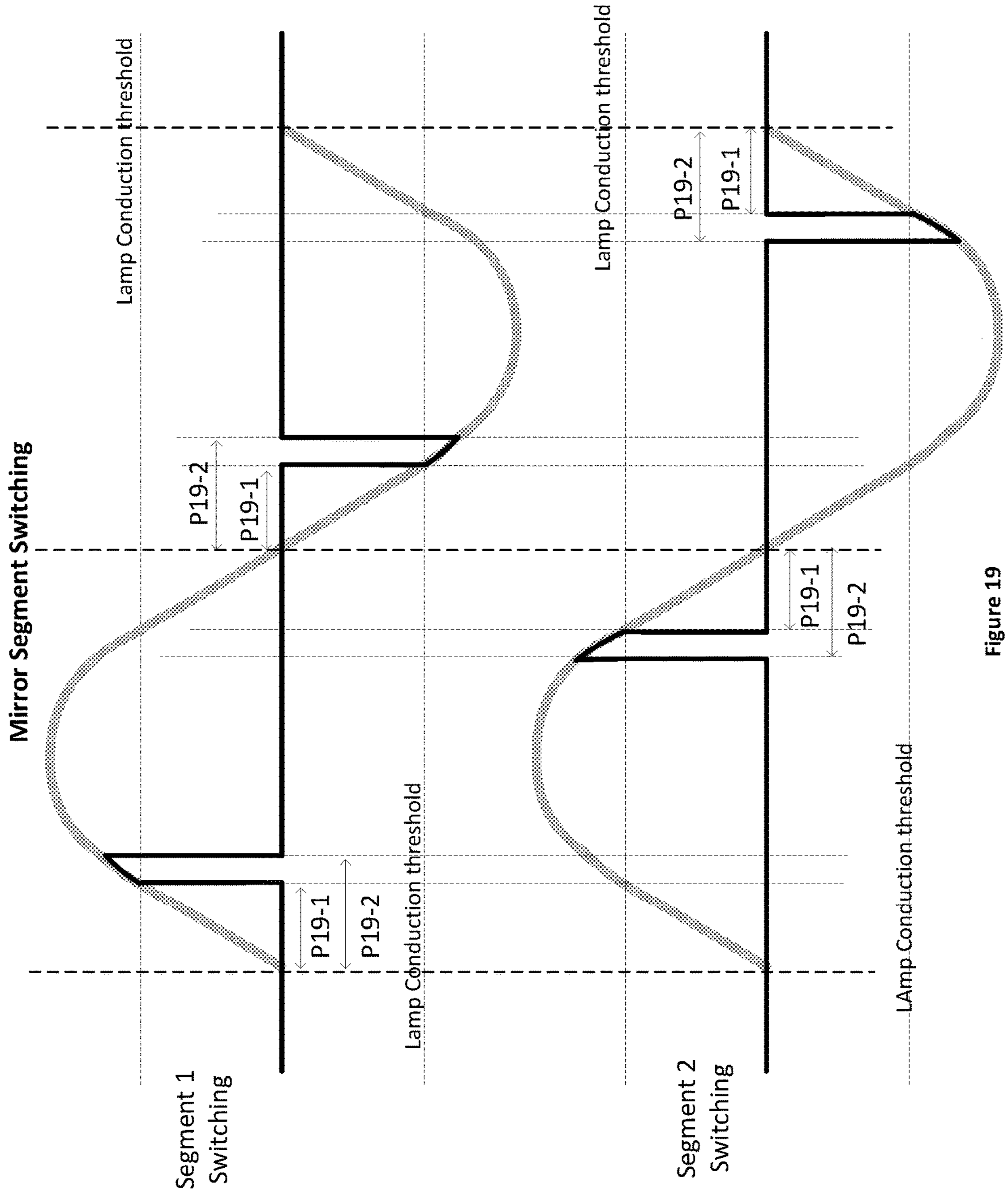
FIG. 19 is graphical representation of an embodiment of a method for distributing load between segments of lamps using mirror switching according to the principles of the present invention.
Figure 20:
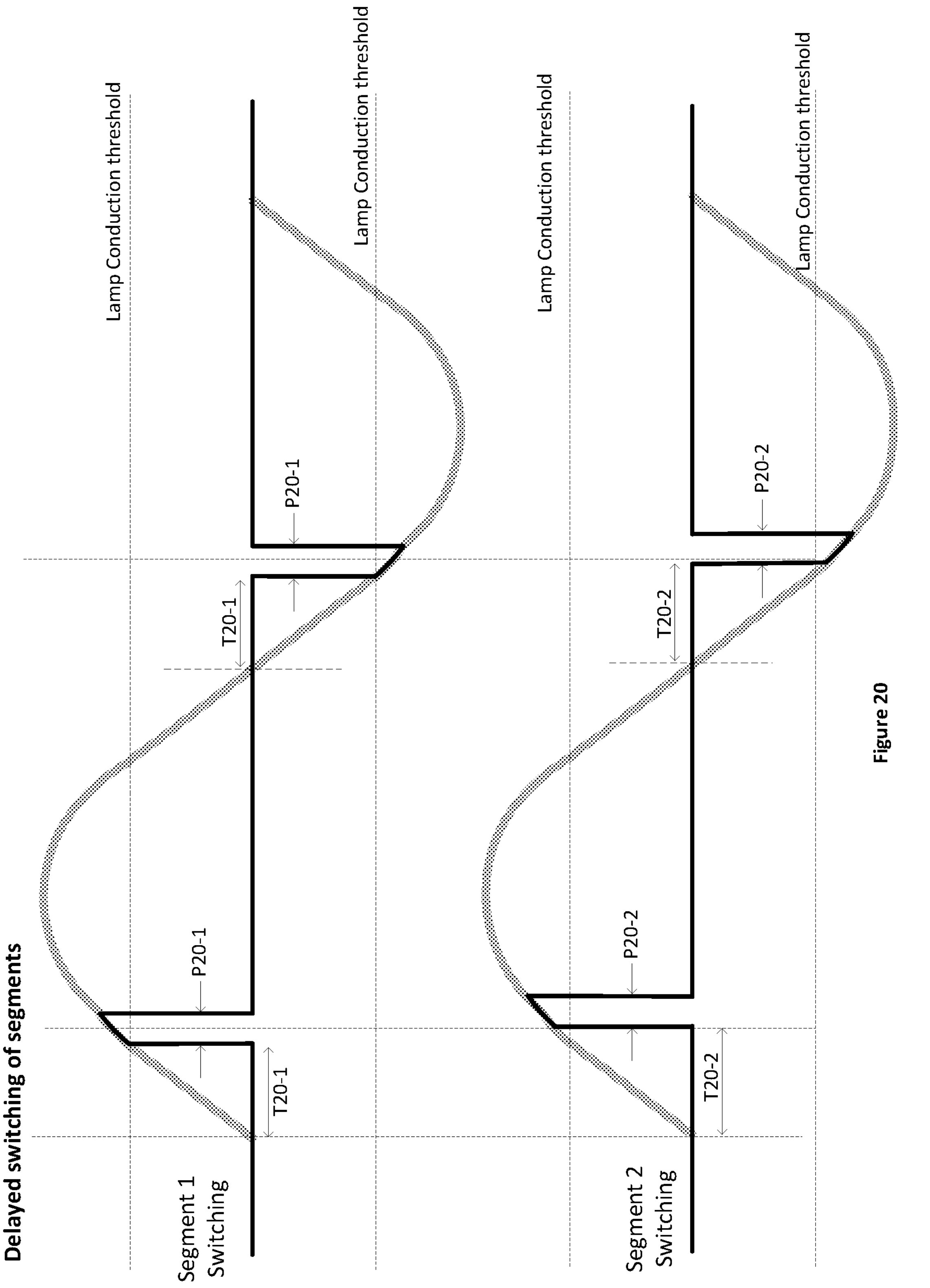
FIG. 20 is graphical representation of an embodiment of a method for limiting flickering of a segment of lamps using delayed switching between lamp segments according to the principles of the present invention.
Figure 21:
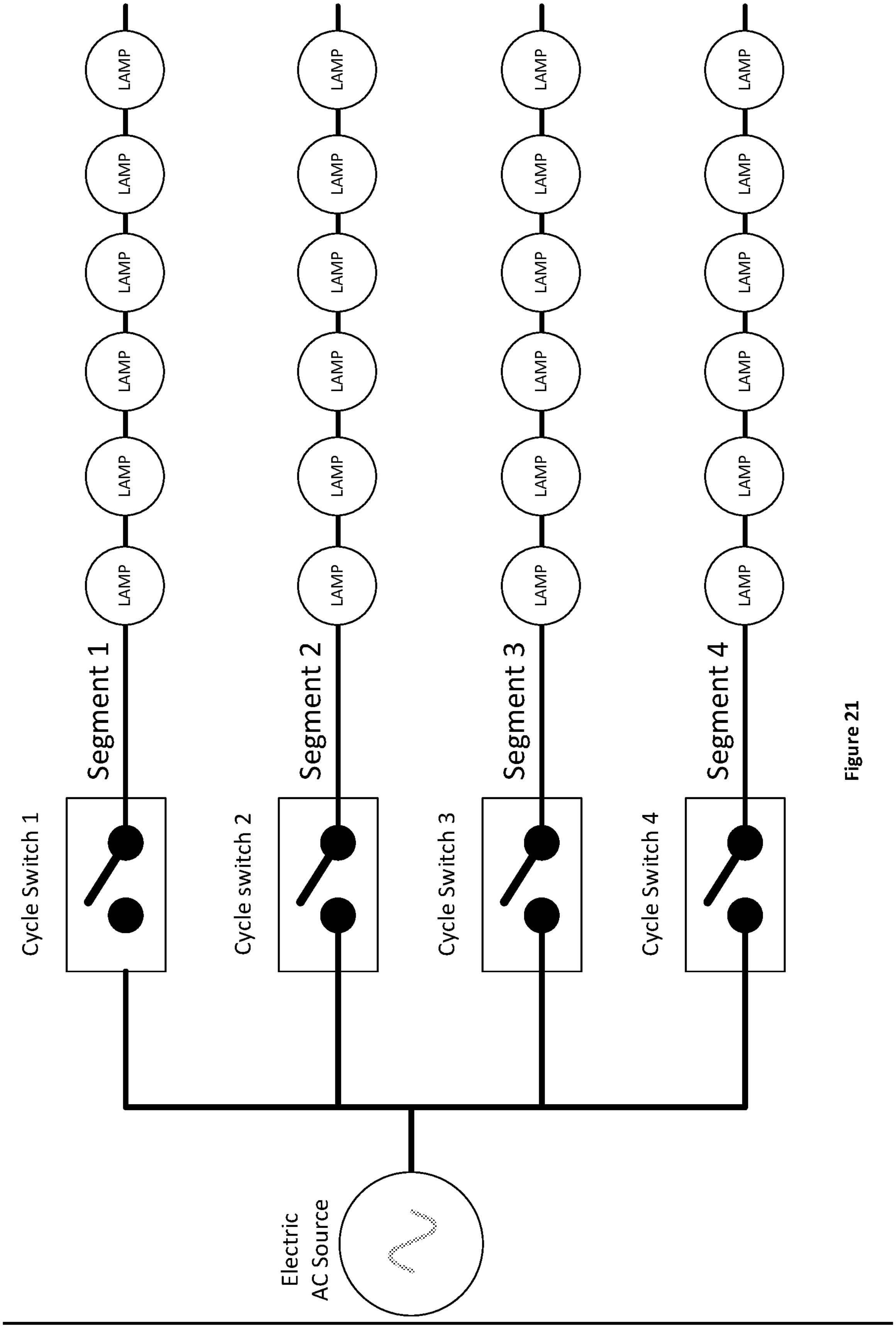
FIG. 21 is an illustration of an embodiment of a system for distributing a lighting load between segments of lamps of a building according to the principles of the present invention.

Referring to FIGS. 19 to 21, a method to distribute the electrical load to limit an electrical momentaneous power demand on the electrical network of a building is provided. The momentaneous and synchronized power demand alters the level of voltage present on the electrical network. The method generally aims at providing a stable voltage during powering of the different segments of lamps of the building. In other words, all the lamps being turned on at the same time may create a peak of power on the electrical network.

The supply distribution method for limiting instantaneous and synchronized power demand causing alterations on the electrical network of the farm starts with the segmentation of the lighting supply in such a way that it is more possibly balanced that is concretely achievable.

Referring to FIG. 19, an exemplary electric load of lighting is divided in four (4) segments of lamps, each segment of lamps comprising six (6) lamps. Each segment comprises an electronic switch. The switch is configured to switch the power supply of the lamps to vary the intensity of light of the lamps. The switching of the power supply may be performed according to a plurality of switching modes.

Still referring to FIG. 19, an embodiment of an unusual case of delayed switching between two segments of lamps having a light intensity being equal or similar and having a conduction period being equal is illustrated. The delayed switching may be used for a plurality of lamp models or types.

The FIG. 19 further illustrates an exemplary type of switching called "mirror switching". The mirror switching comprises, for each half cycle, the angle supplement P19-1 ending the switching of a first segment defines or is equal to the initial angle of the switch of a second segment. The supplement angle may be defined as 180 degrees minus a conduction angle. Similarly, the supplement angle P19-2 which is the initial angle of the switch of the first segment defines or is the same as the closing angle of the switch of the second segment. As such, the voltage powering the lamps is maintained over the lamp conduction thresholds (upper and lower) during the initial load created by the switching on of the segment of lamps.

Referring now to FIG. 20, a method to distribute the load of the lamps between two or more segments by changing the switching angle of each segment is illustrated.

The switch of the first segment initiates the conduction of the lamps of the first segment at time T20-1 following the zero-crossing of the AC cycle. At T20-1, each of the lamps of the first segment are electrically powered at a voltage equal or higher to the activation threshold voltage of the lamps by closing the switch of the first segment. At such time, the instantaneous load or required electrical current on the electrical network of the building momentarily alters the light intensity of the lamps, thus creating flickering of the lamps.

One or some microseconds following the time T20-1, the supply voltage increases at a normal level. At the time T20-2, the switch of the second segment is closed to allow conduction of the electrical signal to the lamps of the second segment. As shown in the example of FIG. 20, the normal level of voltage is reached after the P20-1 duration. After such duration P20-1, the switch of the first segment is opened. On the second segment, the switch is opened at time P20-2. Such sequence is repeated twice at each cycle, a first time on when the voltage is at a positive level and a second time when the voltage is at a negative level.

Still referring to FIG. 20, each duration P20-1 and P20-2 are distinct. The duration P20-2 transfers more electrical energy to the lamps of the second segment than during P20-1, even if the durations P20-2 and P20-1 were equal. In some embodiment, the method to maintain a stable intensity of light or for achieving lighting having identical intensity may comprise delaying switching on two distinct segments of lamps. As an example, the method may comprise applying the durations P20-1 and P20-2 for which the integrals of the voltage over the duration of the switching are equivalent.

In some embodiments, the intensities produced by the lamps may not be proportional to the power send to or received by the lamps. In such embodiments, the method to maintain a stable intensity of light between two distinct segments of lamps using delayed switching may comprise defining a curve of equivalence of intensities sent to the lamps as a function of predetermined conduction angles. The curve of equivalence may be used to determine or calculate the duration of conduction of lighting based on the desired light intensity.

Referring now to FIG. 21, an embodiment of a system for distributing a lighting load between segments of lamps of a building according to the principles of the present invention is illustrated. In such embodiment, an exemplary building comprises a total load of twenty-four (24) lamps.

Although it has been described using one or more preferred embodiment(s), it should be understood that the present invention may be used, employed and/or embodied in a multitude of other forms. Thus, the following claims must be interpreted to include these different forms while remaining outside the limits set by the prior art.

The invention claimed is:

1. A method for maintaining a desired stable light intensity of a plurality of lights to reduce flickering of lamps, the method comprising executing an automatic switching sequence to alter an AC power supply powering at least two independent segments of lamps, each electrically connected to a switching device, wherein the switching sequence comprising, for each half cycle of the AC power source,
  maintaining open each of the switches connected to the segments of the lamps after a zero crossing of the AC cycle;
  closing the switch of the first segment to turn on the lamps of the first segment;
  waiting for at least one microsecond;
  closing the switch of the second segment after a delay to turn on the lamps of the second segment;
  opening the switch of the first segment to turn off the lamps of the first segment when the lamps of the first segment reach the desired light intensity; and
  opening the switch of the second segment to turn off the lamps of the second segment when the lamps of the second segment reach the desired light intensity.

2. The method of claim 1, wherein the waiting corresponding to a time to recover a loss of voltage caused the lamps of one of the segments being turned on.

3. The method of claim 1, wherein the segments comprising more than two segments, the closing of the switches of the segments being triggered in sequence and with a delay following the closing of the switch of another segment.

4. The method of claim 3, wherein the delay following the closing of the switch of the other segment being 1 micro second.

5. The method of claim 1, wherein the delay being randomly changed after one or more half cycle of the AC power supply.

6. The method of claim 1, wherein further comprising adjusting a conduction period of the lamps based on a turn-on angle of the AC power signal for producing the desired light intensity of the lamps to automatize equalization of the lighting intensity of the lamps between the at least two segments.

7. The method of claim 6, wherein further comprising using a transfer function to establish the duration of the conduction period according to the desired lighting intensity and to a firing angle of one of the at least two segments of lamps.

8. The method of claim 7, wherein further comprising using a characteristic curve of the intensity transmitted by the lamps of the segments according to switching angle and to duration of conduction for the light intensity of the lamps is a function of the switching angles.

9. A method for maintaining a desired stable light intensity of a plurality of lights to reduce flickering of lamps, the method comprising executing an automatic switching sequence to alter an alternative current (AC) power supply powering at least two independent segments of lamps at the desired light intensity, each of the segments of lamps being electrically connected to a switching device, wherein the switching sequence comprising, for each half cycle of the AC power source,
  maintaining open each of the switches connected to the segments of the lamps after a zero crossing of the AC cycle;
  closing the switch of the first segment when the voltage is above the lamps turn-on threshold defining a first conduction angle to turn on the lamps of the first segment;
  opening the switch of the first segment when the desired light intensity of the first segment is reached defining a second conduction angle to turn off the lamps of the first segment;
  closing the switch of the second segment when a conduction angle of the AC of the second segment is a supplement of the second conduction angle to turn on the lamps of the second segment; and
  opening the switch of the second segment when a conduction angle is a supplement of the first conduction angle.

10. A lighting system maintaining a stable light intensity and reducing the in-rush current of the lighting system, the system comprising:
  two paired segments powered by alternative current (AC), each AC half-cycle having a duration $P_{hcycle}$, each segment comprising:
    a plurality of lamps;
    an electronic switch connected to the segment;
    wherein a switching sequence of the electronic switch starts at a zero-crossing point $T_0$ of the AC voltage, the electronic switch being open at $T_0$;
  the switching sequence of the electronic switch connected to the first segment comprising:
    a. closing the electronic switch to turn on the first segment of the lamps at a time from $T_0$ for a conduction period of $P_{on}$;
    b. following the step a, opening the electronic switch to turn off the first segment of lamps at a time $T_{1off}$, the period $P_{1off}$ being $T_{1off}-T_0$;

the switching sequence of the electronic switch connected to the second segment comprising:

c. closing the electronic switch to turn on a second of the two segments of the lamps at a time $P_{hcycle}-P_{1off}$ from $T_0$ for the conduction period of $P_{on}$;

d. following the step c, opening the electronic switch to turn off the second segment.

11. The lighting system of claim 10, comprising a plurality of paired segments, wherein activation of each of the paired segments is delayed between each activation.

12. The lighting system of claim 11, the delayed activation being selected to allow AC voltage disturbance caused by inrush current in one of the paired segments to subside before activating the next paired segments to reduce cumulative inrush current effects on waveform of the AC.

13. The lighting system of claim 11, wherein each of the paired segments has different switching angles, the lighting system being configured to vary the conduction duration of each of the paired segments to equalize the light intensity between the paired segments.

14. The lighting system of claim 10, wherein the closing of the electronic switch to supply power to the first segment being performed when the AC voltage exceeds the conduction threshold of the lamps in the first segment.

* * * * *